Nov. 24, 1931.　　　M. L. TURNER　　　1,832,923
APPARATUS FOR MACHINING SURFACES
Filed Jan. 8, 1930　　　2 Sheets-Sheet 1
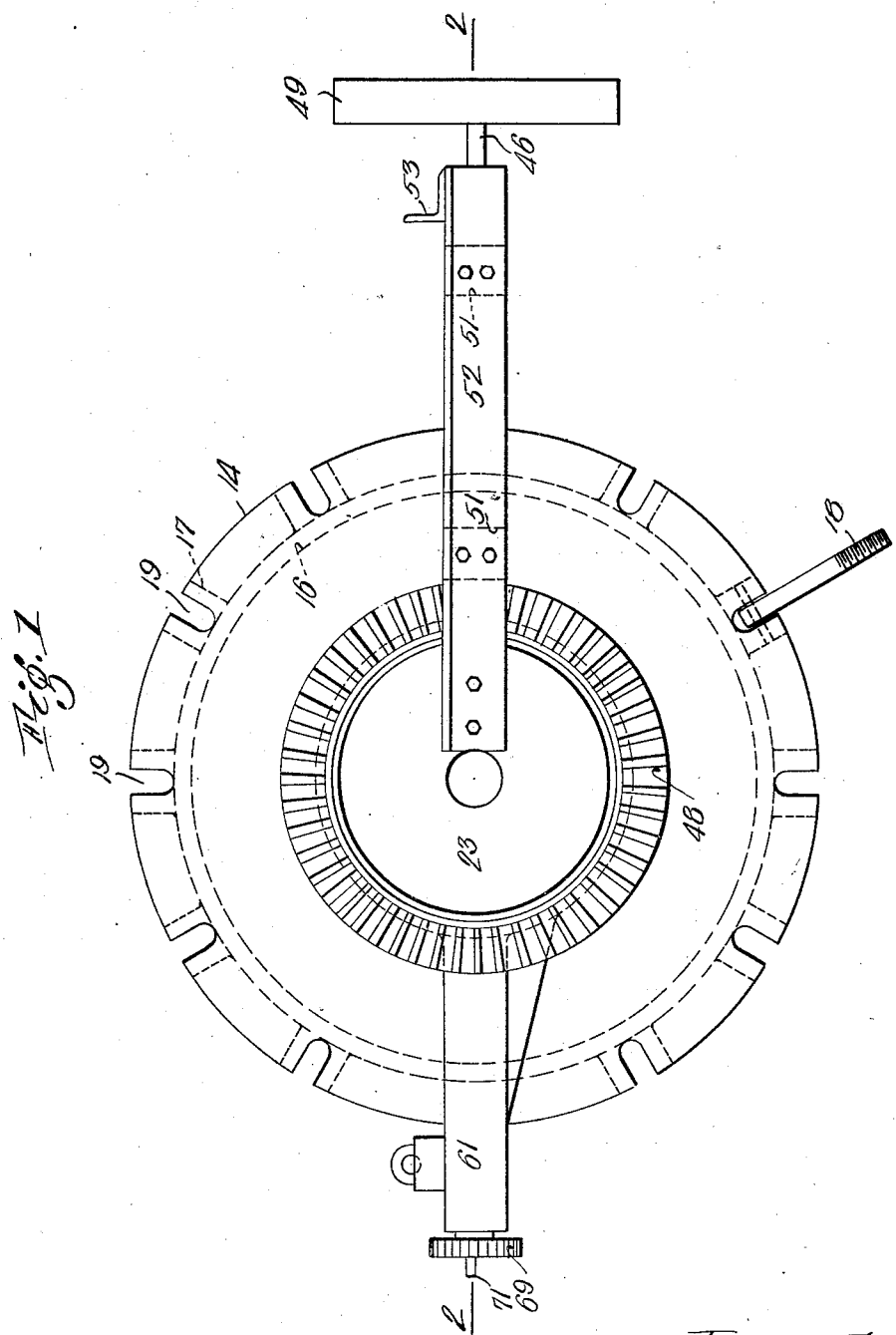

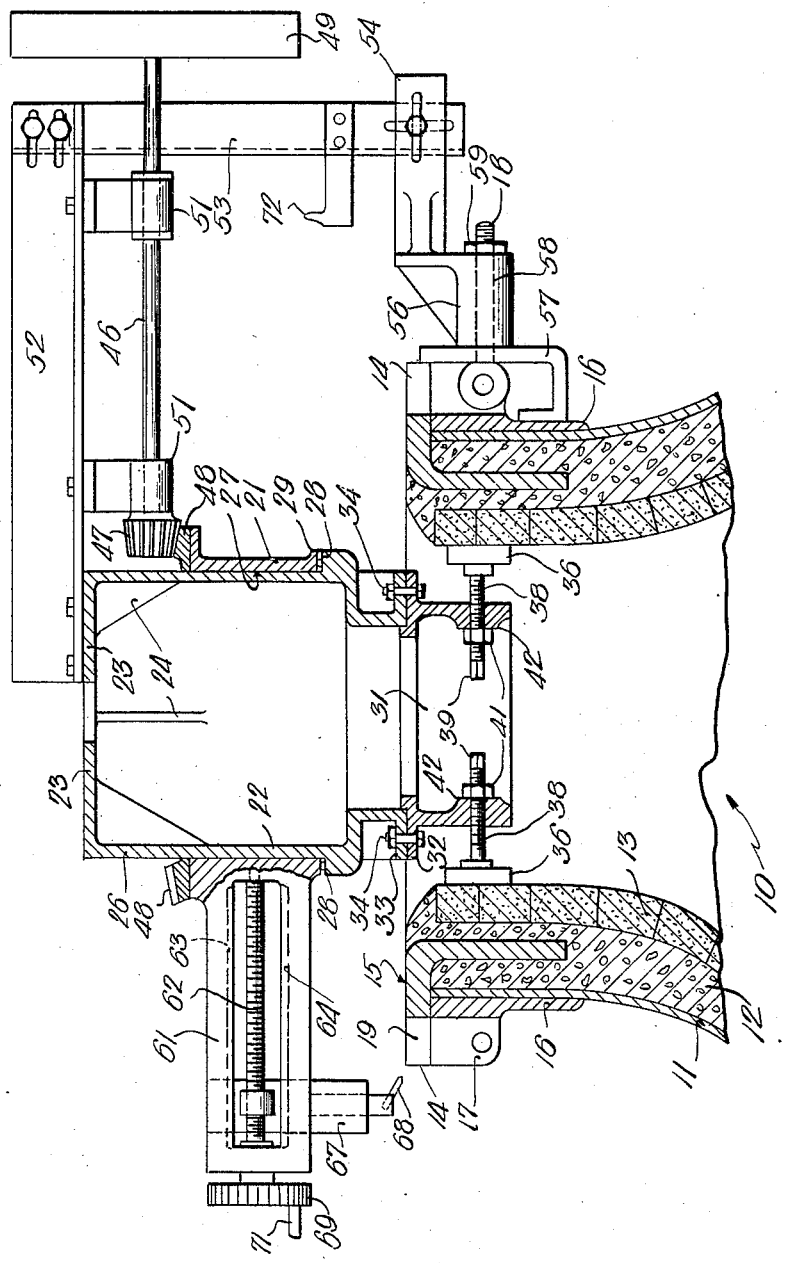

Patented Nov. 24, 1931

1,832,923

UNITED STATES PATENT OFFICE

MILTON L. TURNER, OF AUGUSTA, MAINE

APPARATUS FOR MACHINING SURFACES

Application filed January 8, 1930. Serial No. 419,397.

This invention relates to apparatus for machining surfaces and for making facing cuts on hollow or annular bodies.

Facing cuts are often required on surfaces of bodies which are so large and cumbersome that they can be set up only in very large machines of relatively expensive construction such as are not commonly available. Frequently these bodies are of a composite construction and very heavy so that in many instances of this kind it has been considered advisable whenever possible to dismantle the body sufficiently to remove the member requiring repair which may then be effected on machines of usual size and capacity. Considerable labor and time may be required for carrying out even the latter procedure.

Objects of the present invention are to provide improved means for machining surfaces and for facing hollow or annular bodies; to provide portable apparatus which may be readily attached to the body to be machined; and also to provide apparatus of this character of simple and efficient and yet rugged and durable construction.

The present invention provides for effecting the desired results without encountering inconveniences and disadvantages of various kinds including those above described. Apparatus for these purposes may comprise relatively rotatable members having cooperating bearing surfaces, one of these members carrying a cutter while the other extends axially beyond the cutting plane so that it may be affixed, preferably by expansible means, to the interior of the body to be machined and thus serve as a support for the other member which carries the cutter. The expansible or other attaching means may be carried by a detachable base which may be affixed by the attaching means in position to assure a proper cut before it is subjected to the weight of the cutter operating mechanism and of other portions of the apparatus. This considerably simplifies the work of setting up the apparatus. While power may be transmitted to the rotatable member in various ways it is preferably transmitted at a point on the opposite side of the cutting plane from that on which the expansible attaching means are located as this affords a simple, efficient construction and assures an adequate path of orbit for operation of the cutter carrying mechanism. Power is transmitted to the cutter operating mechanism through a shaft supported in a framework attached to the exterior of the body to be machined and to the member which supports the cutter operating mechanism, thus providing a rugged durable construction. The apparatus is of a portable character and may be moved about readily to places where the work is located.

In the drawings:

Fig. 1 is a plan view of apparatus for machining surfaces; and

Fig. 2 is a section taken substantially along the line 2—2 of Fig. 1, but showing some parts in elevation.

A preferred embodiment of the invention is illustrated as applied to an annular body comprising in this instance the neck of a container, such as a digester used in a sulphite mill. This container 10 comprises a metal shell 11 which encloses a cement body 12, the latter being lined with acid-proof brick 13. A top flange 14 is set into the cement body and has a substantially flat radial surface 15 against which a cover (not shown) seats. These containers are required to stand a cooking pressure of approximately 60 to 70 pounds gage pressure. A band 16 attached to the shell 11 at the neck of the container carries circumferentially spaced radial lugs 17 arranged in pairs for supporting swing bolts 18 which are operable through radial slots 19 in the superposed flange 14 for securing the cover in position. The contents of these containers include acids and other corrosive substances which are destructive of the plane metal surface 15 against which the cover must seat.

When the top flange 14 becomes pitted and worn away to such an extent that it will no longer function properly it has heretofore been customary to remove enough of the brick lining and break away the cement so that the cover flange 14 might be removed and the surface 15 thereof trued up in a lathe or other machine. As will be apparent, this is a tedious operation which requires taking the container out of service for approximately 48 hours. Furthermore the flange 14 is backed with litharge and glycerine before it is set in the cement and this backing must be replaced before the flange is again set in the cement body.

As the machining operation involved in refinishing the top flange is a relatively simple one it will be apparent that a tremendous saving in time as well as in labor can be effected by apparatus capable of performing this operation without necessitating removal of the flange from the container. Apparatus provided for this purpose as shown particularly in Fig. 2, comprises relatively rotatable members 21, 22, which may be castings as shown. The inner member 22 is preferably in the form of a hollow cylinder open at its lower end and having a transverse end wall 23 at its upper end, suitable interior webs 24 being disposed at the upper end to assure a sturdy construction. The member 22 has a cylindrical exterior surface 26 which functions as a journal to receive the interior cylindrical bearing surface 27 of the outer member 21. The journal 26 terminates at its lower end in an exterior shoulder 28 which functions as a thrust bearing to receive the load transmitted from a similar shoulder 29 on the outer member 21.

The cylindrical member 22 is arranged to be attached to the interior of the annular body to be machined so that it may serve as a stationary support for the rotatable outer member 21. To accomplish this without sacrificing any bearing area, especially when the bearing 26 approximates the inside diameter of the body to be machined, the lower end 31 of the cylindrical member is made of less diameter than the upper portion thereof. Preferably this portion of reduced diameter is made as a separate part having a radial flange 32 which is adapted to be attached to a similar flange 33 of the upper portion by means of bolts 34.

The lower skirt portion 31 of the cylindrical member carries expansible members, such as the blocks or pads 36 which are engageable with the opposed interior surfaces of the annular body. These pads 36 are swivelled on the outer ends of bolts 38 which are threaded through radial holes in the skirt and have squared inner ends 39 by which they may be turned and lock nuts 41 which are adapted to seat against interior bosses 42 to lock the bolts in adjusted position. By adjusting the position of the bolts 38 the cylindrical member 22 may be secured to the interior of the annular body.

Power for operating the rotary member 21 is transmitted from the power shaft 46 through bevel gearing comprising the pinion 47 on the power shaft and the ring gear 48 which is affixed to the rotary member.

The power shaft may be provided with a pulley 49 or with other approved means for receiving power. The power shaft is carried in spaced bearings 51 secured to a horizontal member, as the angle 52 which is attached at one end to the transverse top wall 23 of the cylindrical member 22 and at its other end to an upright angle 53. The lower end of this upright angle is affixed to a lateral arm 54 of a casting 56 which has at its inner end an L-shaped foot 57. This casting has a lateral hole 58 of a size slidably to receive one of the swing bolts 18. The L-shaped foot is adapted to seat at its upper end against the periphery of the top flange 14 and at its lower end against the band 16 on the neck of the container. A nut 59 on the swing bolt clamps the casting 56 and the L-shaped foot in position and thus the frame which supports the power shaft is secured to the exterior of the container and to the cylindrical member 22.

The rotatable member 21 has a radial arm 61 the intermediate portion of which is cut away to receive a feed screw 62 which is journalled in the inner and outer ends of the arm. Dovetail guideways 63, 64 extend along the upper and lower edges of the cut away portion to receive similarly shaped portions of the cross-head, the latter being connected to a vertically disposed tool holder 67 which depends below the arm. A cutting tool 68 is shown mounted in the tool holder. The feed screw shaft extends beyond the outer end of the arm and a gear 69 is fast on this extended portion of the feed screw. A handle 71 is mounted on the gear so that the latter may be operated manually to adjust the position of the cutter. The feed screw is operated automatically by an abutment 72 carried by the vertical angle 53 and disposed in the path of the gear. As the arm 61 rotates about the cylindrical member 22, a tooth of the gear 69 is brought into engagement with abutment 72 during each revolution of the arm 61 and such engagement rotates the gear 69 and advances the cutter. In setting up the apparatus for operation the lower skirt portion 31 may be detached from the cylindrical member 22 and affixed in position in the neck of the container by adjusting the bolts 38. The top flange 32 of this skirt portion may be lined up with the surface 15 of the flange to be refinished. When this has been accomplished the cylindrical member 22 may again be attached to the lower skirt portion 31 and a facing cut may be made at once without further adjustment.

I claim:

1. Apparatus of the class described comprising relatively rotatable members having cooperating bearing surfaces, a cutter carried by one of the relatively rotatable members for cutting substantially radial surfaces on an annular body, means for affixing the other of the relatively rotatable members to the interior of the annular body, a power shaft, bevel gearing for transmitting power from the power shaft to said one of the relatively rotatable members, a frame affixed to said other of the relatively rotatable members, means for attaching the frame to the exterior of the annular body, and spaced bearings carried by the frame for supporting the power shaft.

2. Apparatus of the class described comprising upper and lower annular members having mating end surfaces, expansible means carried by the lower annular member for engagement with the interior side walls of a member to be machined, the expansible means being accessible for adjustment from within the lower annular member, a tool carrier, and means for supporting the tool carrier on the upper annular member for movement in an orbital path about the latter member.

3. Apparatus of the class described comprising upper and lower annular members having exterior mating flanges, adjusting screws extending substantially radially through the lower annular member, pads on the outer ends of these screws for engagement with the interior side walls of a body to be machined, the upper annular member having a substantially cylindrical bearing surface, a rotary member having a complementary bearing surface fitting the first-named bearing surface, and a tool carrier mounted on the rotary member for movement with the latter in an orbital path about the annular members.

Signed by me at Augusta, Maine, this sixth day of January, 1930.

MILTON L. TURNER.